United States Patent [19]
Dollahite et al.

[11] Patent Number: 5,748,877
[45] Date of Patent: May 5, 1998

[54] METHOD FOR EXECUTING EMBEDDED DIAGNOSTICS FROM OPERATING SYSTEM-BASED APPLICATIONS

[75] Inventors: Bill Dollahite; Rick Finch, both of Austin, Tex.

[73] Assignee: Dell USA, L.P., Austin, Tex.

[21] Appl. No.: 401,047

[22] Filed: Mar. 8, 1995

[51] Int. Cl.$^6$ .................................................. G06F 11/00
[52] U.S. Cl. ......................................................... 395/183.12
[58] Field of Search ........................ 395/183.01, 183.07, 395/183.08, 183.12, 182.21; 364/267

[56] References Cited

U.S. PATENT DOCUMENTS

| | | | |
|---|---|---|---|
| 4,701,845 | 10/1987 | Andreasen et al. | 364/200 |
| 4,860,201 | 8/1989 | Stolfo et al. | 395/800 |
| 5,321,816 | 6/1994 | Rogan et al. | 364/200 |
| 5,335,231 | 8/1994 | Kato | 395/183.07 |
| 5,367,667 | 11/1994 | Wahlquist et al. | 395/183.01 |
| 5,398,333 | 3/1995 | Schieve et al. | 395/700 |
| 5,410,713 | 4/1995 | White et al. | 395/750 |
| 5,446,904 | 8/1995 | Belt et al. | 364/200 |
| 5,455,933 | 10/1995 | Schieve et al. | 395/183.03 |

*Primary Examiner*—Albert Décady
*Attorney, Agent, or Firm*—Haynes and Boone, L.L.P.

[57] ABSTRACT

Method and apparatus for transparently executing embedded PC diagnostics from an OS-based application is disclosed. In a preferred embodiment, responsive to a user request to execute diagnostics code embedded in BIOS memory, an OS-based utility of the present invention calls an OS-independent BIOS routine for saving the state of the PC to a hard disk thereof, resetting the PC and initiating execution of the embedded diagnostics code. The embedded diagnostics code runs to completion from PC reset, saving failure and status information to a nonvolatile storage device, and resets the PC once more. The PC boots normally from reset and restores the state of the PC from the hard disk, thereby restoring the OS-based utility, which may then be used to access the saved failure and status information and display, print or otherwise act on the information.

30 Claims, 2 Drawing Sheets

METHOD FOR EXECUTING EMBEDDED DIAGNOSTICS FROM OPERATING SYSTEM-BASED APPLICATIONS

TECHNICAL FIELD

The invention relates generally to hardware diagnostics for personal computers (PC) and, more particularly, to a method for executing embedded hardware diagnostics from an operating system-based applications program.

BACKGROUND OF THE INVENTION

It is generally accepted that the most reliable way to perform comprehensive, user-selectable hardware diagnostics on a personal computer (PC) is to execute diagnostics code embedded in BIOS memory (hereinafter "embedded diagnostics") from system power-up or reset. In this manner, a series of hardware diagnostics tests may be performed in a "crawl-out" sequence, with hardware components being initialized and tested one at a time and with no tests relying on components that have not yet been tested. This procedure allows for greater fault detection and component level and field replaceable unit (FRU) fault isolation and eliminates dependency on the operating system (OS), BIOS and component drivers. In addition, embedded diagnostics will run even if the PC will not boot an OS, which may often be the case.

A problem with the use of embedded diagnostics is that they cannot be run directly from an OS, such as DOS or Windows, without resetting the PC and thereby losing the OS and all open applications. In addition, a technical support representative that has accessed a customer's PC using a remote-control communications package, for example, PC Anywhere or CarbonCopy, is also unable to run the embedded diagnostics to help isolate hardware problems for that same reason.

An alternative to embedded diagnostics has been to develop OS-based diagnostics applications that can be run without the user's resetting or rebooting the PC. Accordingly, such OS-based diagnostics applications can also be run under the control of a "remote" user, such as a technical support representative. An example of an OS-based diagnostics application available "off-the-shelf" is QAPlus.

OS-based diagnostics applications also suffer from certain deficiencies, not the least of which is their failure effectively to test hardware and identify failing components, due in part to the fact that the OS, BIOS and drivers create a software "layer" between the diagnostics application and the hardware being tested. Moreover, available OS-based diagnostics applications are dependent on the identity of the OS, BIOS and drivers. In this regard, multitasking OSs, such as Windows, create additional problems for OS-based diagnostics applications, since a main purposes of such OSs is to isolate the hardware from all applications, including diagnostics.

Therefore, what is needed is a way to execute embedded diagnostics from an OS-based application in a manner that is transparent to both a user and an OS of the PC.

SUMMARY OF THE INVENTION

The foregoing problems are solved and a technical advance is achieved by method and apparatus for transparently executing embedded PC diagnostics from OS-based applications. In a departure from the art, an OS-based utility of the present invention calls an OS-independent BIOS routine for saving the state of the PC to a hard disk thereof, resetting the PC, initiating execution of diagnostics code embedded in BIOS memory, and, upon completion of the execution of the embedded diagnostics code, restoring the state of the PC from the hard disk.

In a preferred embodiment, once the OS-based utility of the present invention has been initiated, a user may request execution of the embedded diagnostics by, for example, typing in an appropriate command or selecting a designated icon. Responsive to the request, the utility calls an OS-independent BIOS routine for executing a suspend-to-disk (S2D) operation, resetting the PC, and initiating the embedded diagnostics. The embedded diagnostics code runs to completion from PC reset, saving failure and status information to a nonvolatile storage device, and resets the PC once more. The PC boots normally from reset and executes a resume-from-disk (RFD) to restore the state of the PC, thereby restoring the OS-based utility. The utility may then be used to access the saved failure and status information and display and/or otherwise act on the information.

In one aspect of the present invention, a TEST flag stored in the nonvolatile storage device or a configuration register of the PC is set by the BIOS function to cause the embedded diagnostics code to be executed responsive to a subsequent PC reset and then cleared by the embedded diagnostics after execution of the test sequence to cause BIOS boot code to be executed responsive to a subsequent PC reset.

In another aspect of the present invention, the embedded diagnostics code can be executed to perform power-up self-tests and adjustments of memory, CPU, digital circuitry, read/write chips and currents, and the tape handling mechanism, for example.

A technical advantage achieved with the invention is that it provides a seamless, transparent interface between an OS-based application and the embedded diagnostics.

A further technical advantage achieved with the invention is that it provides a technical support representative with the ability to run the embedded diagnostics remotely, using either a custom or off-the-shelf communications package.

DETAILED DESCRIPTION OF THE PREFERRED EMBODIMENT

Figure 1:
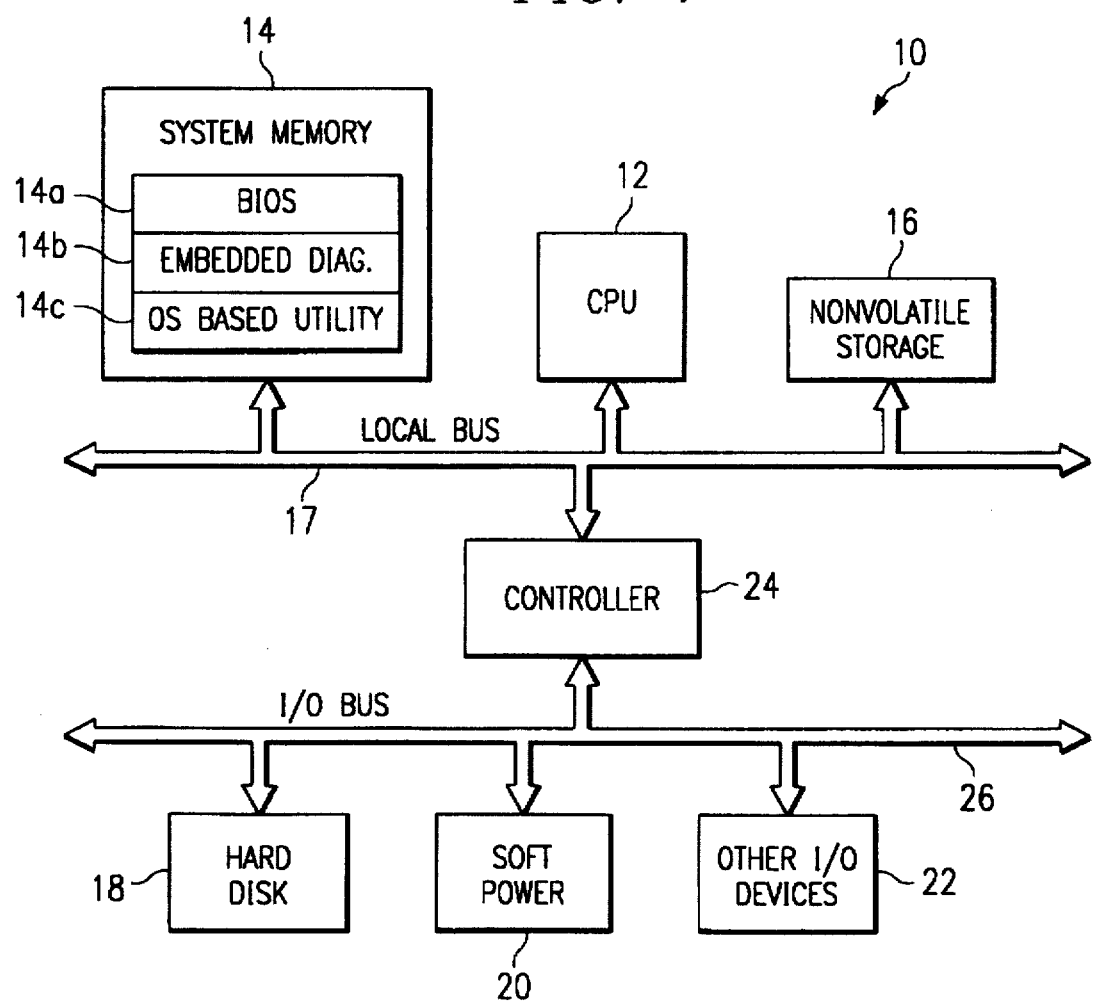
FIG. 1 is a block diagram of a personal computer (PC) for implementing the method of the present invention.

FIG. 1 is a system block diagram of a personal computer (PC) 10 in which a method of the present invention for transparently executing embedded diagnostics from an OS-based application is implemented. In a preferred embodiment, the PC 10 comprises a CPU 12 connected to system RAM 14 via a memory controller 16 and a host bus 17. The CPU 12 is further connected to a hard disk 18, soft power circuitry 20, BIOS memory 22, a nonvolatile storage device, such as NVRAM 24, and a plurality of other I/O devices, including, for example, one or more of a keyboard, a display and a mouse, and collectively designated by a reference numeral 26, via the host bus 17, bus controller 28 and an I/O bus 30. An OS-based utility embodying features of the present invention, designated by a reference numeral 14a, is stored in system RAM 14 for purposes which will be described in detail with reference to FIG.

Additionally, customized BIOS code and embedded diagnostics code, respectively designated by reference numerals 22a and 22b, are stored in BIOS memory 22, which, in a preferred environment, comprises a flash memory device, an electrically erasable programmable read-only memory (EEPROM) or some other appropriate ROM device.

In particular, the BIOS code 22a includes conventional boot code and code for implementing an OS-independent BIOS function for suspending the operation of the PC 10 to the hard disk 18, setting a TEST flag (not shown) in NVRAM 24 or a configuration register (not shown), and resetting the PC 10. The state of TEST flag (set or clear) when the PC 10 is reset indicates whether or not the embedded diagnostics code 22b is to be executed.

Figure 2:
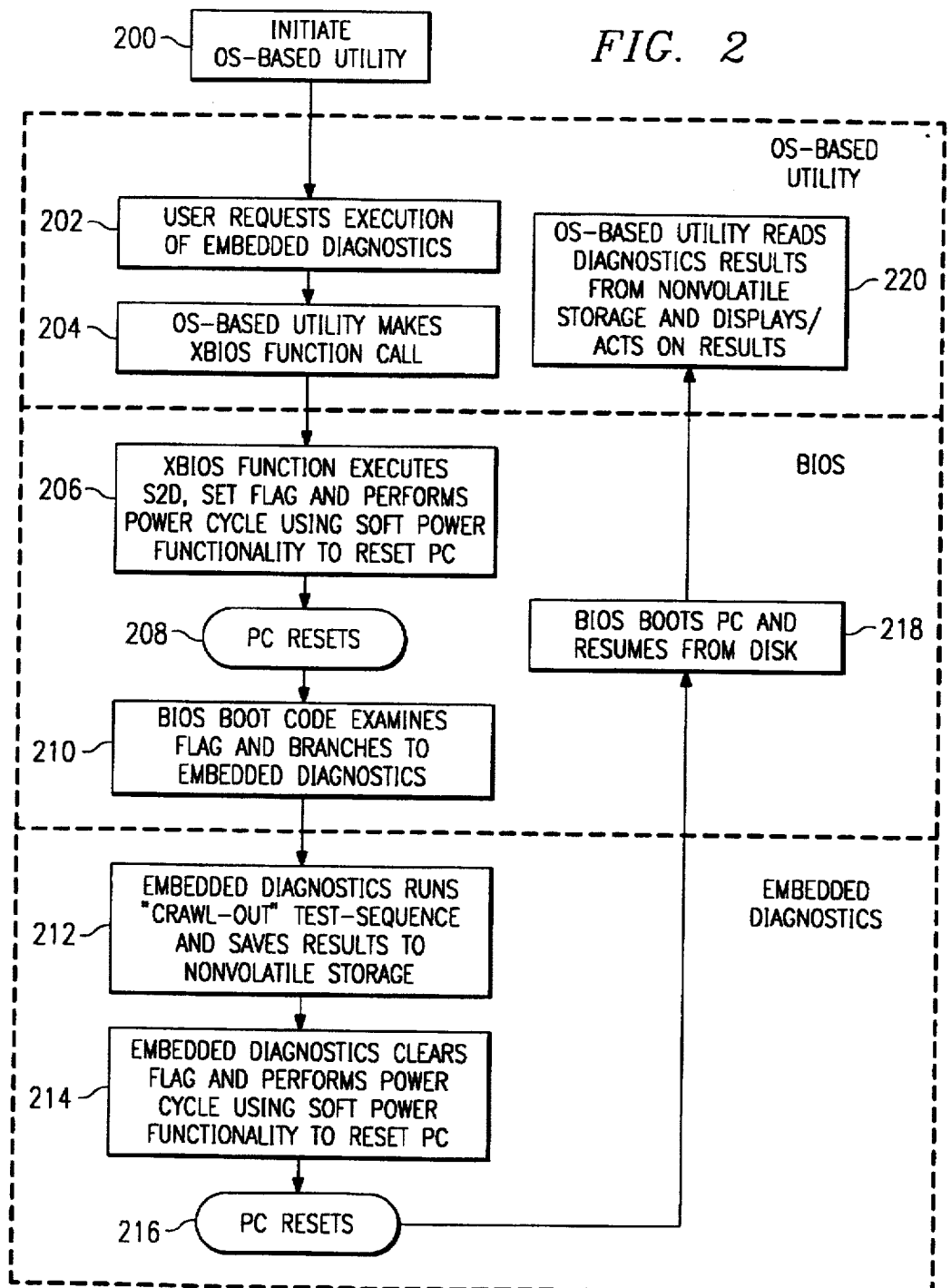
FIG. 2 is a flowchart of a block diagram illustrating the operation of the method of the present invention for transparently implementing embedded diagnostics from an OS-based application.

FIG. 2 is a flowchart of the operation of the method of the present invention for executing embedded diagnostics from an OS-based application. Execution begins in step 200 when the OS-based utility 14a is initiated. In step 202, a user requests execution of the embedded diagnostics code 22b, for example, by clicking on an icon designated for that purpose or typing in an appropriate command. As previously indicated, the embedded diagnostics code 22b can be used, for example, to perform power-up self-tests and adjustments of system RAM 14, the CPU 12, and other digital circuitry and read/write chips and currents. In step 204, the OS-based utility 14a calls the OS-independent BIOS function. In step 206, the OS-independent BIOS function executes a suspend-to-disk (S2D) to suspend the operation of the PC 10 to the hard disk 18, sets the TEST flag (not shown) to indicate that the embedded diagnostics code 22b are to be executed the next time the PC 10 is reset, and causes the soft power circuitry 20 to reset the PC 10 in step 208. In step 210, BIOS code 22a examines the state of the TEST flag in step 206 and, upon determining that the TEST flag is set, branches into execution of the embedded diagnostics code 22b.

In step 212, the embedded diagnostics code 22b runs its "crawl-out" test sequence and stores the resulting status and failure information in NVRAM 24. In step 214, the embedded diagnostics code 22b clears the TEST flag previously set in step 206 and causes the soft power circuitry 20 to execute a power cycle to reset the PC 10 in step 216. In step 218, the BIOS code 22a reboots the PC 10 using the boot code thereof and, upon examining the TEST flag and determining that it is clear, executes a resume-from-disk (RFD) operation to restore the state of the PC 10 to where it was prior to execution of step 206. In step 220, the OS-based utility 14a accesses the status and failure information stored in NVRAM 24 and displays and/or acts upon the information.

In this manner, the crawl-out test sequence of the embedded diagnostics code 22b is executed transparently to both the user and the OS, with the results being stored in NVRAM 24 for subsequent access by the user or a technical support representative via a display or printer connected to the PC 10. In addition, the system of the present invention provides technical support representatives with the ability to initiate the embedded diagnostics code 22b from a remote location, view the results of the diagnostics tests, and then act accordingly, all without requiring user interaction.

It is understood that the present invention can take many forms and embodiments. The embodiments shown herein are intended to illustrate rather than to limit the invention, it being appreciated that variations may be made without departing from the spirit or the scope of the invention. For example, the remote utility could be configured automatically to reconnect after the embedded diagnostics have been run, as PC reset would break the connection. In addition, the same concept could be used to run a ROM-based setup or other utility from an OS-based application.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a hard disk and a memory device for storing BIOS code, a method for executing hardware diagnostics code embedded in said memory device, the method comprising, saving a state of said computer to said hard disk responsive to a request for execution of said embedded diagnostics code;

automatically resetting said computer without additional user input;

responsive to said resetting, executing said embedded diagnostics code;

storing results of said executing to a nonvolatile storage device of said computer;

automatically resetting said computer a second time without additional user input after said storing; and responsive to said second resetting, restoring said computer to said saved state.

2. The method of claim 1 further comprising, prior to said first resetting, setting a TEST flag for causing said embedded diagnostics code to be executed responsive to said computer being reset.

3. The method of claim 2 further comprising, prior to said second resetting, clearing said TEST flag.

4. The method of claim 1 further comprising displaying said stored results.

5. The method of claim 1 further comprising printing said stored results.

6. The method of claim 1 wherein said request for execution of said embedded diagnostics code is generated from a remote terminal electrically connected to said computer, the method further comprising accessing said stored results with said remote terminal.

7. The method of claim 1 wherein said saving is executed by an operating system (OS)-independent BIOS function.

8. In a computer comprising a hard disk and a memory device for storing BIOS code, a method for executing hardware diagnostics code embedded in said memory device:

requesting execution of said embedded diagnostics code from an operating system (OS)-based applications program;

responsive to said requesting execution of said embedded diagnostics code, executing a BIOS function for saving a state of said computer to said hard disk; resetting said computer;

examining a TEST flag of said computer to determine whether said TEST flag is set or clear;

responsive to said TEST flag being set:
  executing said embedded diagnostics code;
  saving results of said executing to a nonvolatile storage device of said computer;
  resetting said computer a second time after said saving;

responsive to said TEST flag being clear:
    restoring said computer state from said hard disk.

9. The method of claim 8 wherein said executing said BIOS function further comprises setting said TEST flag.

10. The method of claim 8 wherein said executing said embedded diagnostics code further comprises clearing said TEST flag.

11. The method of claim 8 further comprising displaying said stored diagnostics results.

12. The method of claim 8 further comprising printing said stored diagnostics results.

13. The method of claim 8 wherein said requesting is initiated from a remote terminal, the method further comprising accessing said stored diagnostics results at said remote terminal.

14. The method of claim 8 wherein said requesting comprises making a BIOS function call.

15. Apparatus for performing a series of hardware diagnostics tests in a computer comprising a processor, a hard disk, BIOS memory and a nonvolatile storage device electrically interconnected via at least one bus, the apparatus comprising:

BIOS code for execution by said processor and stored in said BIOS memory, said BIOS code comprising code for implementing an operating system (OS)- independent function for executing a suspend-to-disk (S2D) operation to save a state of said computer responsive to a request for performance of said hardware diagnostics tests, setting a TEST flag, and resetting said computer;

diagnostics code for execution by said processor and stored in said BIOS memory, said diagnostics code comprising code for performing said hardware diagnostics tests, storing results of said hardware diagnostics tests in said nonvolatile storage device, clearing said TEST flag and resetting said computer a second time after said storing;

said BIOS code further comprising code for execution by said processor examining said TEST flag responsive to said computer being reset, executing said diagnostics code if said examined TEST flag is set, and executing a resume-from-disk (RFD) operation to restore said saved computer state if said examined TEST flag is clear.

16. The apparatus of claim 15 further comprising OS-based utility code executable by said processor for calling said OS-independent function responsive to a user-initiated request for performance of said hardware diagnostics tests.

17. The apparatus of claim 15 further comprising OS-based utility code executable by said processor for accessing said stored test results.

18. The apparatus of claim 15 further comprising a printer connected to said computer system for printing said stored test results.

19. The apparatus of claim 15 further comprising a display for displaying said stored test results.

20. The apparatus of claim 15 further comprising a remote terminal electrically connected to said computer for requesting performance of said hardware diagnostics tests and accessing said test results.

21. The apparatus of claim 15 wherein said BIOS memory is a read-only memory.

22. The apparatus of claim 15 wherein said BIOS memory is a flash memory.

23. The apparatus of claim 15 wherein said BIOS memory is an electrically erasable programmable read-only memory.

24. In a computer comprising a hard disk and a memory device for storing BIOS code, an apparatus for executing hardware diagnostics code embedded in said memory device, the apparatus comprising:

means responsive to a request for execution of said embedded diagnostics code for saving a state of said computer to said hard disk and resetting said computer;

means responsive to said resetting for initiating execution of said embedded diagnostics code;

means for storing results of said executing to a nonvolatile storage device of said computer;

means for resetting said computer a second time subsequent to said storing; and means responsive to said second resetting for restoring said computer to said saved state.

25. The apparatus of claim 24 wherein said means for saving and resetting further comprises means for setting a TEST flag to cause said embedded diagnostics code to be executed responsive to said computer being reset.

26. The apparatus of claim 25 wherein said means for initiating execution further comprises means for clearing said TEST flag.

27. The apparatus of claim 24 further comprising means for displaying said stored results.

28. The apparatus of claim 24 further comprising means for printing said stored results.

29. The apparatus of claim 24 wherein said request for execution of said embedded diagnostics code is generated from a remote terminal electrically connected to said computer, the apparatus further comprising means for accessing said stored results using said remote terminal.

30. The apparatus of claim 24 wherein said means for saving and resetting comprises an operating system (OS)- independent BIOS function.

* * * * *